United States Patent
Nekhala

(10) Patent No.: US 11,596,239 B2
(45) Date of Patent: Mar. 7, 2023

(54) FLEXIBLE MATERIAL TIGHTENER WITH RESILIENT COUPLER

(71) Applicant: Jack Nekhala, Linden, NJ (US)

(72) Inventor: Jack Nekhala, Linden, NJ (US)

(*) Notice: Subject to any disclaimer, the term of this patent is extended or adjusted under 35 U.S.C. 154(b) by 116 days.

(21) Appl. No.: 16/663,276

(22) Filed: Oct. 24, 2019

(65) Prior Publication Data

US 2021/0120964 A1    Apr. 29, 2021

(51) Int. Cl.
*A47G 9/02* (2006.01)
*A47C 21/02* (2006.01)
*F16G 11/00* (2006.01)

(52) U.S. Cl.
CPC .......... *A47C 21/022* (2013.01); *A47G 9/0238* (2013.01); *F16G 11/00* (2013.01)

(58) Field of Classification Search
CPC . Y10T 24/3713; Y10T 24/39; Y10T 24/3703; Y10T 24/3913; Y10T 24/47; Y10T 24/3724; Y10T 24/3969; A43C 7/00; A43C 7/08; F16G 11/00; F16G 11/06; E06B 9/326
See application file for complete search history.

(56) References Cited

U.S. PATENT DOCUMENTS

| 4,790,048 A * | 12/1988 | Arnt | A43C 7/00 24/712.1 |
| 4,976,048 A * | 12/1990 | Blackman | G01B 3/1005 242/381.3 |
| 6,334,240 B1 * | 1/2002 | Li | A43C 7/00 24/115 G |
| 6,625,849 B1 * | 9/2003 | Womack | G02B 6/4471 24/115 M |
| 2003/0024084 A1 * | 2/2003 | Liu | A43C 7/00 24/712.1 |
| 2010/0115735 A1 * | 5/2010 | Manvel | E06B 9/326 24/116 A |
| 2020/0138145 A1 * | 5/2020 | Greenspan | A43C 7/06 |

* cited by examiner

*Primary Examiner* — Robert Sandy
*Assistant Examiner* — Michael S Lee
(74) *Attorney, Agent, or Firm* — Wei & Sleman LLP

(57) ABSTRACT

A rigid coupler having an upper surface, a lower surface and four sides, the coupler incudes a lower portion, an upper portion mateable with the lower portion, at least one inlet defined by the upper and lower portions, and at least one outlet defined by the upper and lower portions.

10 Claims, 13 Drawing Sheets

FLEXIBLE MATERIAL TIGHTENER WITH RESILIENT COUPLER

FIELD OF THE DISCLOSURE

The present disclosure relates generally to coverings for objects and more specifically, to device and methods for tightening sheets and the like onto objects.

BACKGROUND OF THE DISCLOSURE

There are generally speaking, two different types of bed sheets commonly purveyed in the market. There are "fitted sheets," which have a built in elastic or other structure to hold a sheet to a bed, and there are "unfitted sheets," which comprise a layer of fabric to be tucked under the corners of a mattress, or the like. Fitted sheets typically follow the contours of a specific bed more than do unfitted sheets. The former is designed to contract around the contours of a mattress, while the latter is typically tucked under the mattress as tightly as possible. In both cases, one usually must lift at least the corners of the bed and tuck the fabric between a base of a bed and a mattress. This can be strenuous work and is difficult for those of little strength, such as the elderly or handicapped. Further, for hotels, hospitals, and the like, time spent by employees in making up beds is expensive. Additionally, even properly mounted fitted sheets may loosen during the night. This is inconvenient and may be even dangerous when the sheets are used in cribs, or other sleeping structures for infants and children.

What is needed in the art is a way to have a tightly fitting sheet around a bed which is simple to manufacture, inexpensive to procure, and which reduces the time spent in covering a bed with a sheet. Additionally, a method of manufacturing such devices with consistent quality is needed.

SUMMARY OF THE DISCLOSURE

In some embodiments, a rigid coupler having an upper surface, a lower surface and four sides incudes a lower portion, an upper portion mateable with the lower portion, at least one inlet defined by the upper and lower portions, and at least one outlet defined by the upper and lower portions.

BRIEF DESCRIPTION OF THE DISCLOSURE

Various embodiments of the presently disclosed structures and methods are described herein with reference to the drawings, wherein.

Figure 10A:
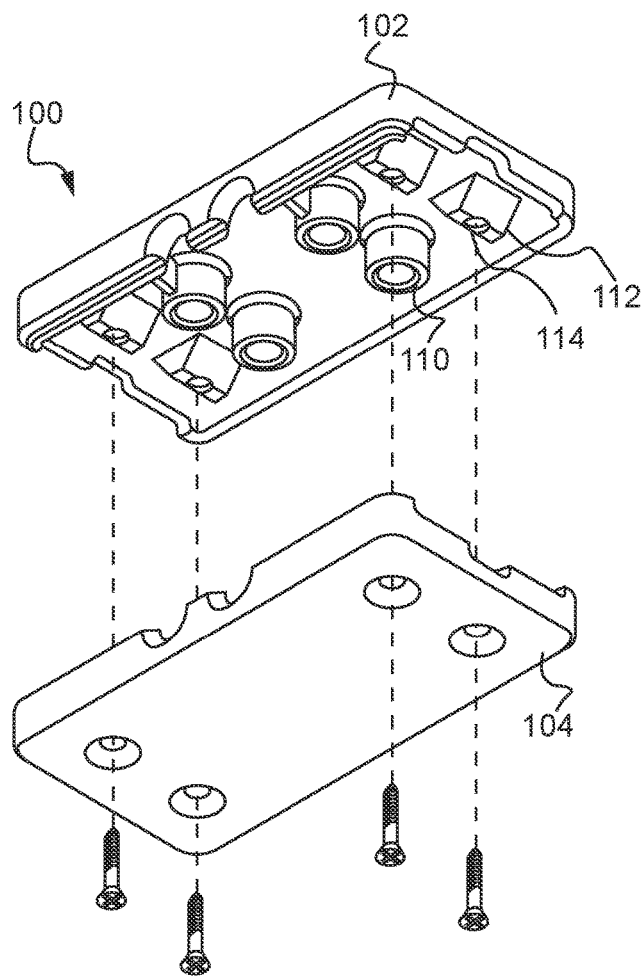
Figure 10B:
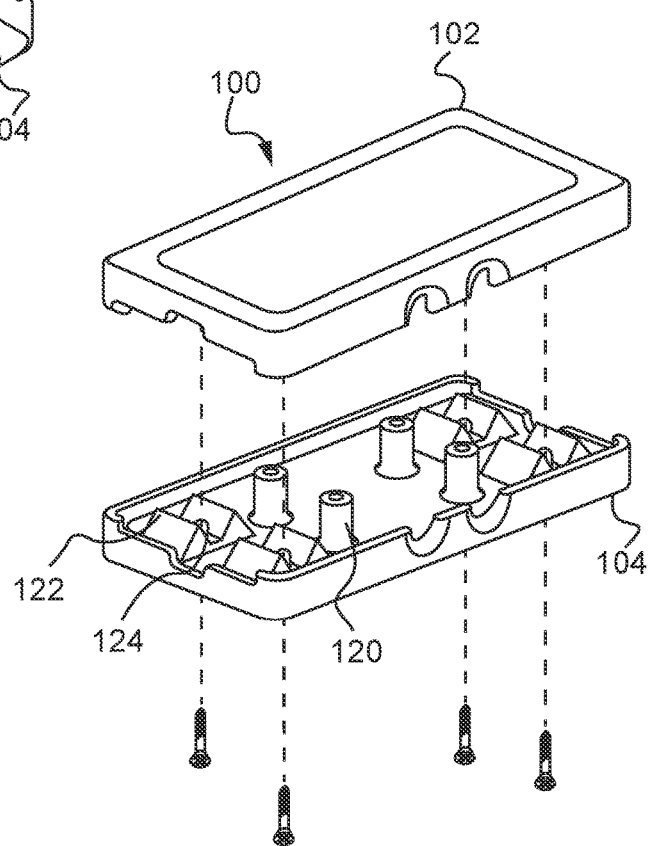
Figure 11A:
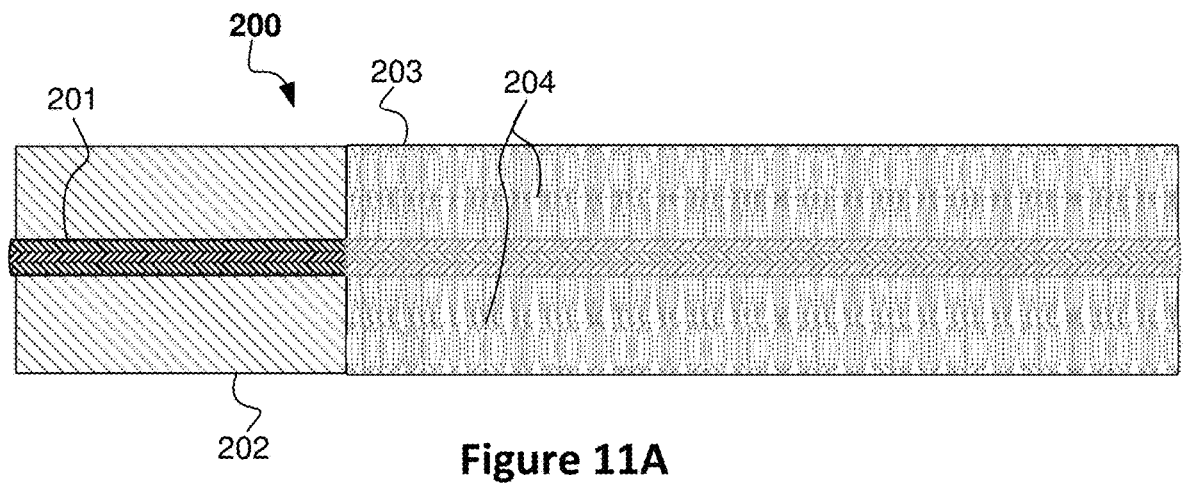
Figure 11B:
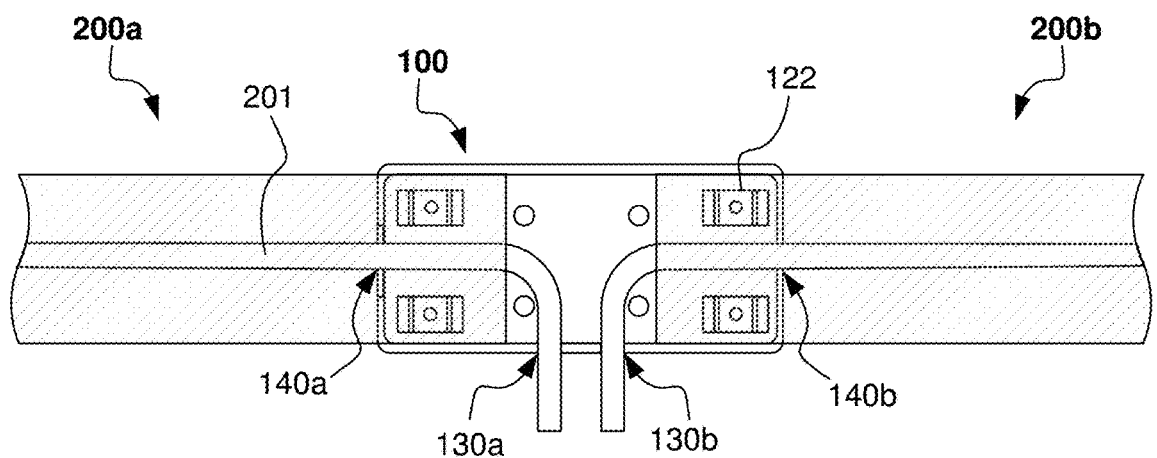
Figure 12:
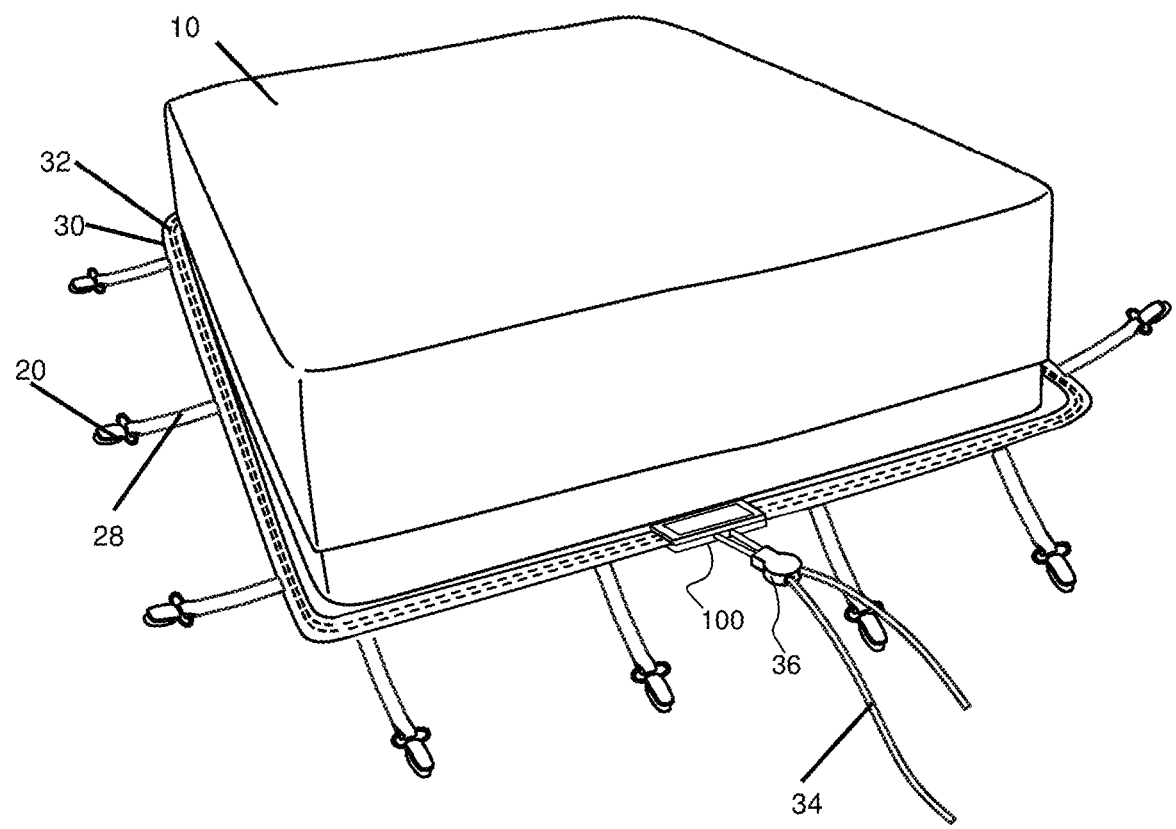

FIGS. 9A-G are schematic back, front, side, side, top, bottom and perspective views, respectively, of a resilient coupler according to one embodiment of the disclosure;

FIGS. 10A-B are schematic exploded views of the resilient coupler of FIGS. 9A-G;

FIGS. 11A and 11B are a schematic representation of a cord, and a schematic showing the use of the resilient coupler to attach two cords together, respectively;

FIG. 12 shows the use of the resilient coupler; and

Figure 13A:
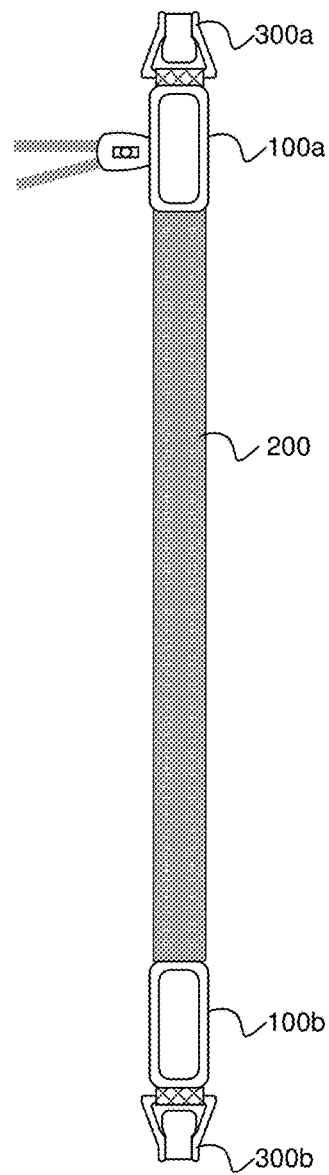
Figure 13B:
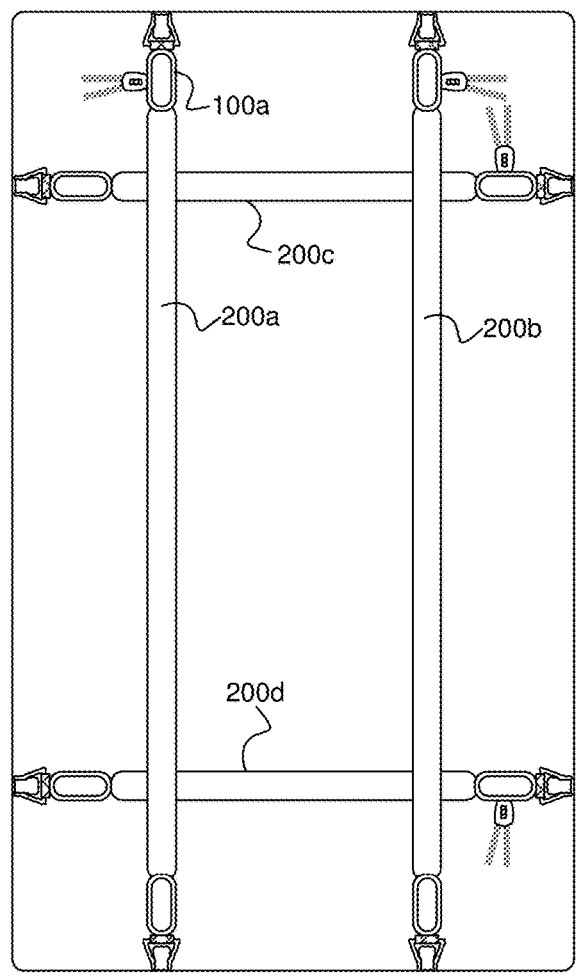

FIGS. 13A-B show another embodiment of resilient couplers, and its used in attaching cords to clips.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to bedding materials and devices, conventional devices and methods suffer from certain shortcomings as described above.

There therefore is a need for further improvements to the devices, systems, and methods of securing bedsheets to beds. Among other advantages, the present disclosure may address one or more of these needs.

U.S. Pat. No. 10,104,981, entitled "FLEXIBLE MATERIAL TIGHTENER," describes a bedding securing device having a cord and outer fabric covering, the disclosure of which is hereby incorporated in its entirety as if fully set forth herein.

In some examples, the disclosure includes a cord with an outer fabric covering over a sheath and draw string. The sheath and/or fabric and/or cord, in general, can be of elastic material (defined as stretchable and compressible from a first length to at least a length double the first length, without losing structural integrity). The cord has a series of clips attached there-to (removably or irremovably) by a second cord or by direct attachment. The clips are in turn removably attachable to edges of a sheet while the sheet is unconnected to, partially on, or fully on the surface and/or sides of the mattress. "Removable," for purposes of this disclosure, is defined as "able to repeatedly attach and detach more than 30 times without losing structural integrity or the ability to continue to attach and detach." Similarly, "irremovable" is defined as "unable to detach without causing destruction to at least some of the materials being detached, such as by cutting, tearing, or removing stitching." One then tightens the draw string, reducing the length of the cord, and continues to do so until the sheet is pulled to a bottom side of the mattress. In this manner, the sheet ends are beneath the mattress and tightened thereto by the cord.

Figure 1:
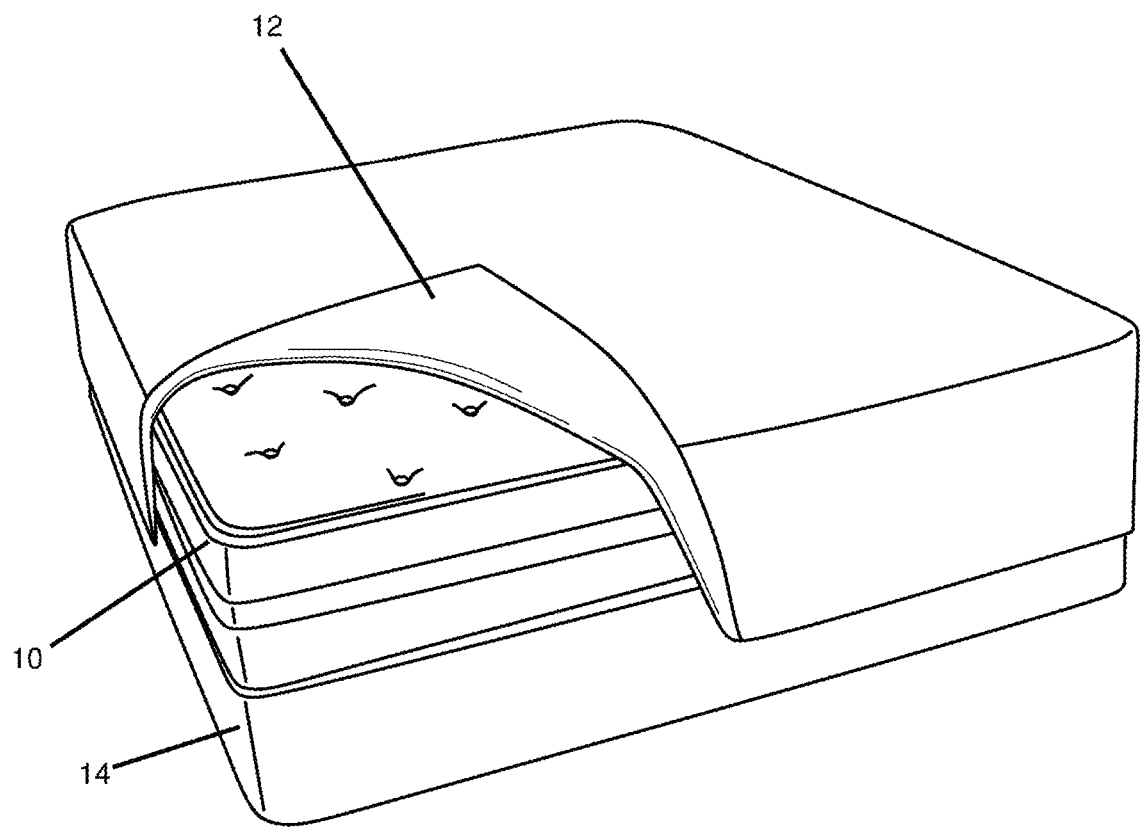
FIG. 1 shows a top perspective view of a bed with sheet, in an embodiment of the disclosure.

FIG. 1 shows a top perspective view of a bed with sheet, in an embodiment of the disclosure. Here, the mattress 10 has right, left, front, and back sides, as well as top and bottom sides. A rectangular mattress is shown, though it should be understood that a mattress of any size or shape is within the scope of the disclosure. The sheet 12 shown is an unfitted sheet draping over at least some of the sides of the mattress 10. The mattress 10 rests on a bed base 14, such as a box spring or other support for the mattress situated between the mattress and the floor.

Figure 2:
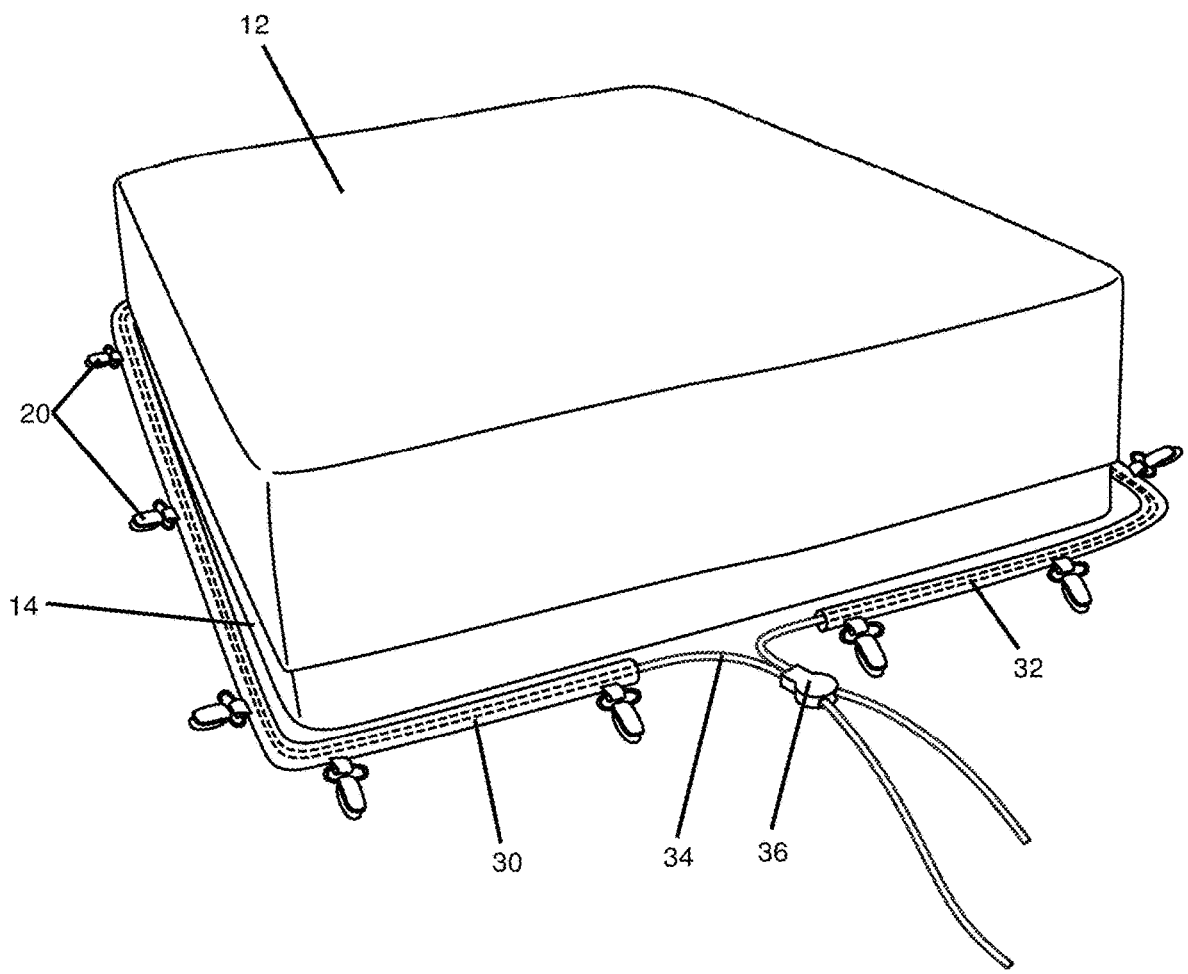
FIG. 2 shows the bed with sheet of FIG. 1, with a draw string cord placed around the perimeter of the bed.

FIG. 2 shows the bed with sheet of FIG. 1, with a draw string cord placed around the perimeter of the bed. The mattress is hidden from view below the sheet 12, which is shown falling on each respective side of the bed. That is, the sheet is placed primarily (mostly) over the top side, with portions hanging down over the left, right, front, and back sides of the mattress situated atop bed base 14. The draw string 34 is shown passing through the portal 32 in the cord 30. The portal runs the length of, and extends through, the cord 30. The cord 30 can be attached at a meeting point or juncture at a lock connector 36 which frictionally grasps the cord and allows one to pull the cord 30 therethrough in one or both directions (decreasing or increasing the length of cord passed through the juncture 36), but in a resting position (defined as, "without human forces or human-directed forces acting thereon"), retaining a present position along the cord 30. The cord 30, the draw string 34, and/or the sheath/portal 32 can each be elastic. In this manner, the cord 30 decreases from a fully stretched out length to a lesser length from end to end while in a resting position. Thus, one stretches the cord to fit around the sides of a mattress and then decreases it in length to snugly fit and remain frictionally attached at the sides of the mattress. The clips 20 will be discussed in detail with reference to FIG. 3.

Figure 3:
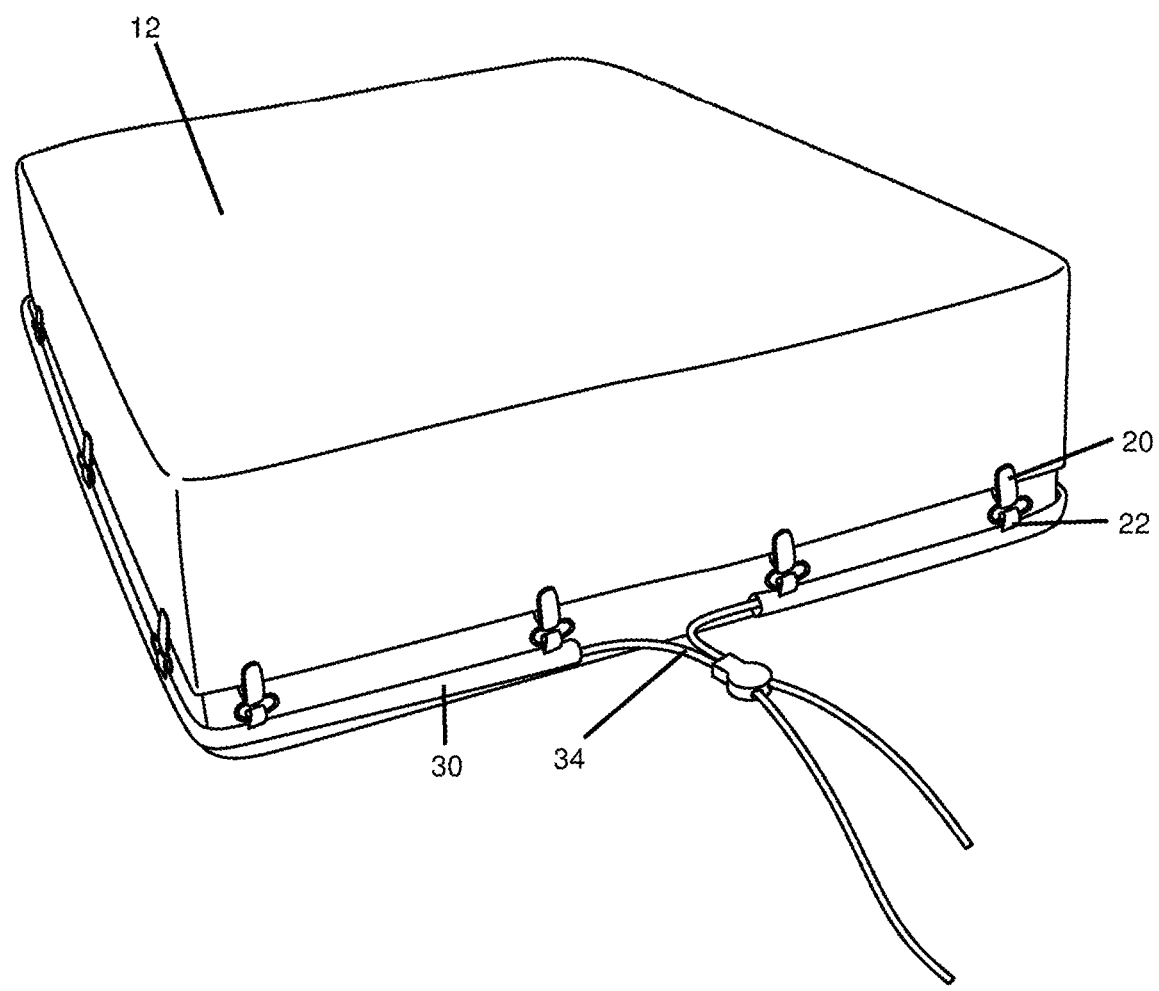
FIG. 3 shows the bed with sheet of the prior figures, with the draw string cord attached to the sheet.

FIG. 3 shows the bed with sheet of the prior figures, with the draw string cord attached to the sheet. Here, note that the clips 20 are on each side (top, left, right, bottom) of the mattress, with at least one per side. The opposite perspective view of the mattress and clips is a mirror image of what is shown, with the exception of the portion where the two ends of the cord 34 come together. In the opposite perspective view, the cord 30 is continuous without an opening in the sheath, in embodiments of the disclosure. The clips 20 have a length of fabric, elastic material, and/or elongated members, which are fixedly and/or irreversibly attached to the length of cord 30. In other embodiments, the clips 20 are detachable from the cord 30, such as by way of a removable clip or snap connector. In any case, the clips 20 are removably attached to the bed sheet 12 on each side, and the draw string 34 is ready to be tightened.

Figure 4:
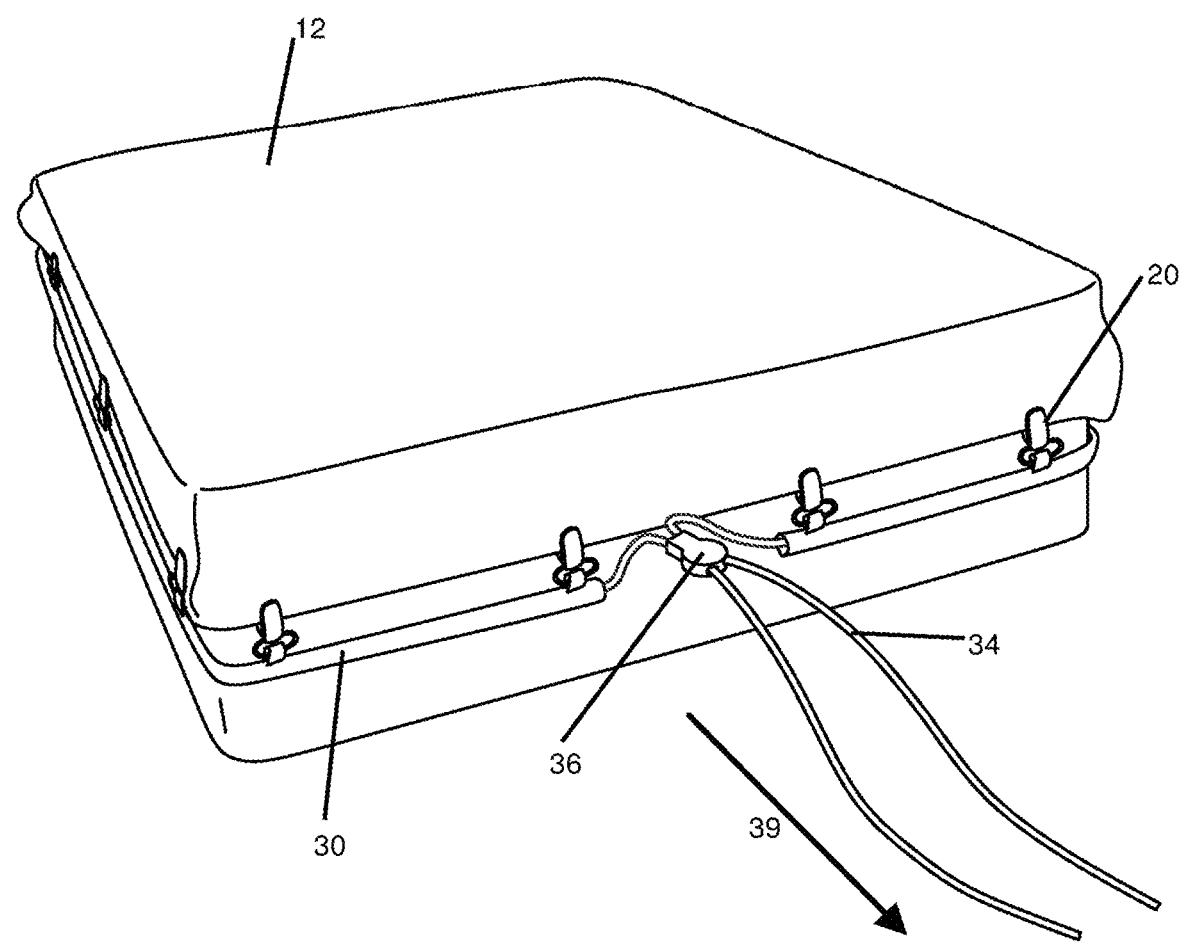
FIG. 4 shows the bed with sheet of FIG. 3, with the draw string being tightened.

FIG. 4 shows the bed with sheet of FIG. 3, with the draw string being tightened. The draw string 34 is tightened by pushing the lock connector 36 closer to the bed while pulling the ends of the string away from the mattress in the direction 39 shown in the figure. This causes the cord 30 to decrease in length as the draw string 34 is pulled out there-from. The direction 39 comprises also a downward vector, in embodiments of the disclosure. That is, in addition to being pulled in a direction directly away from the side of the bed, it is pulled down towards the floor on which the mattress 10 rests, at least slightly. Defining zero degrees as a pull directly horizontal and away from (perpendicular to) the side of the mattress 10, the downward pull is in a direction of −5, −15, −25, −30, or −45 degrees with respect thereto.

It should further be understood that the sheet 12 can be either a fitted or a non-fitted sheet, in different embodiments of the disclosure. When using a fitted sheet, one places the fitted sheet in a manner such that its elastic holds the sheet to each side of the mattress, as shown in FIG. 4. This can be covering half of each side. One then pulls the draw string 34 in the direction 39, as described in the preceding paragraph, and the fitted sheet (or non-fitted sheet) moves downward to cover the entire sides of the bed, and then at least a portion of the bottom of the mattress.

Figure 5:
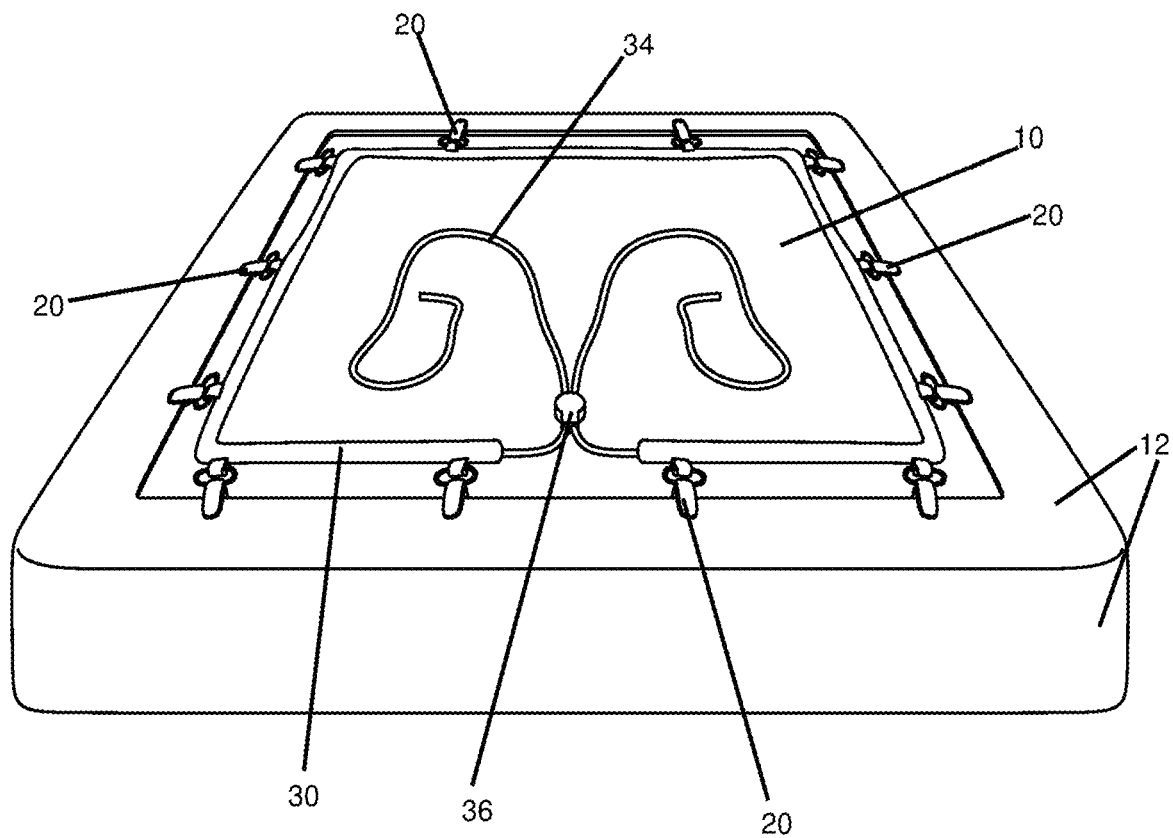
FIG. 5 shows a bottom perspective view of the bed with tightened sheet and draw string, in an embodiment of the disclosure.

FIG. 5 shows a bottom perspective view of the bed with tightened sheet and draw string, in an embodiment of the disclosure. The sheet 12 has been pulled over the entirety of the sides of the mattress 10, as well as at least a portion of the bottom of the mattress adjacent to (defined as "closest to") each side thereof. The clips 20 remain attached to the sheet 12 as well as to the cord 30.

Figure 6:
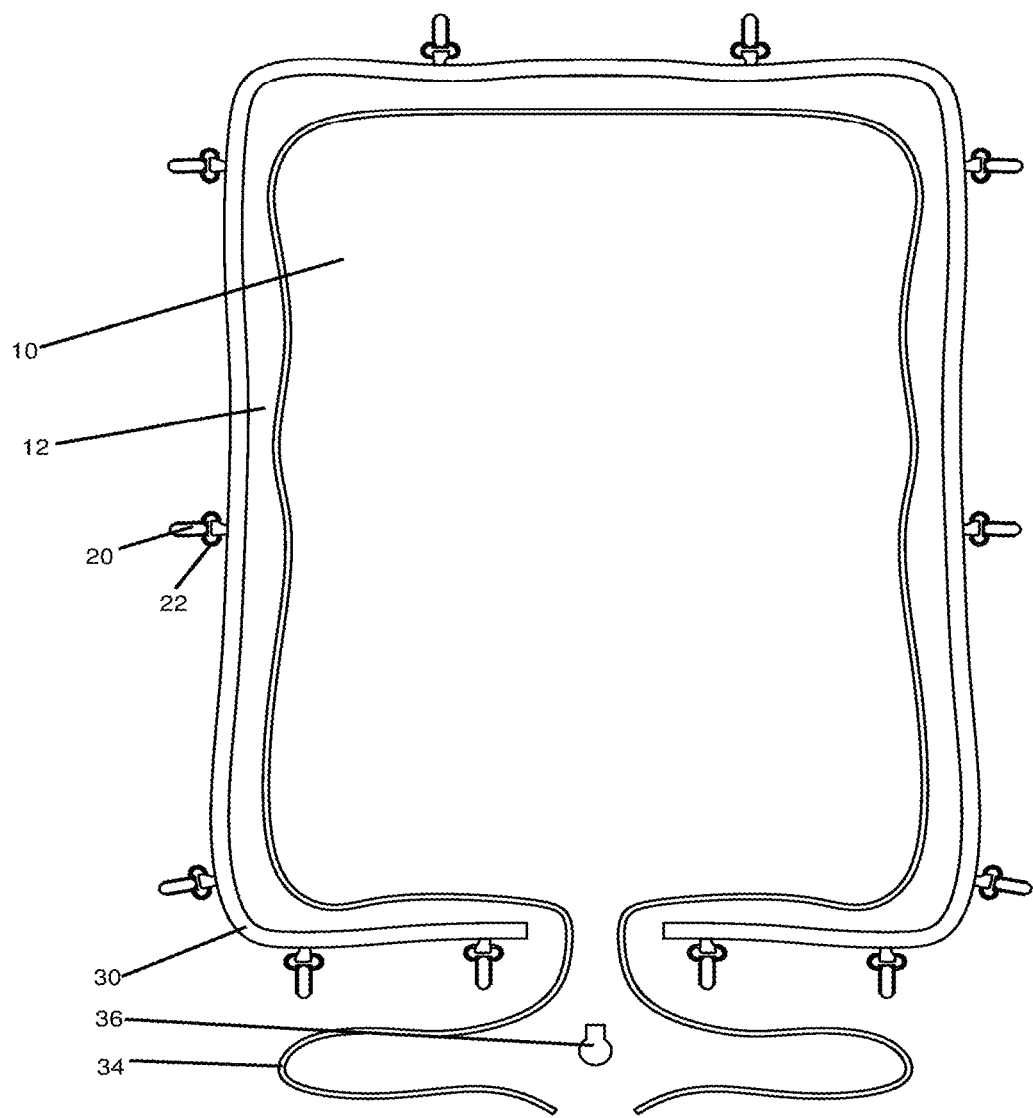
FIG. 6 shows the separate items used with embodiments of the disclosure.

FIG. 6 shows the separate items used with embodiments of the disclosure. Here, one sees the draw string 34 in its entirety, its length being greater than that of the cord 30 into which it fits. The clips 20 are attached removably or irremovably via material 22 to the cord 30.

Figure 7:
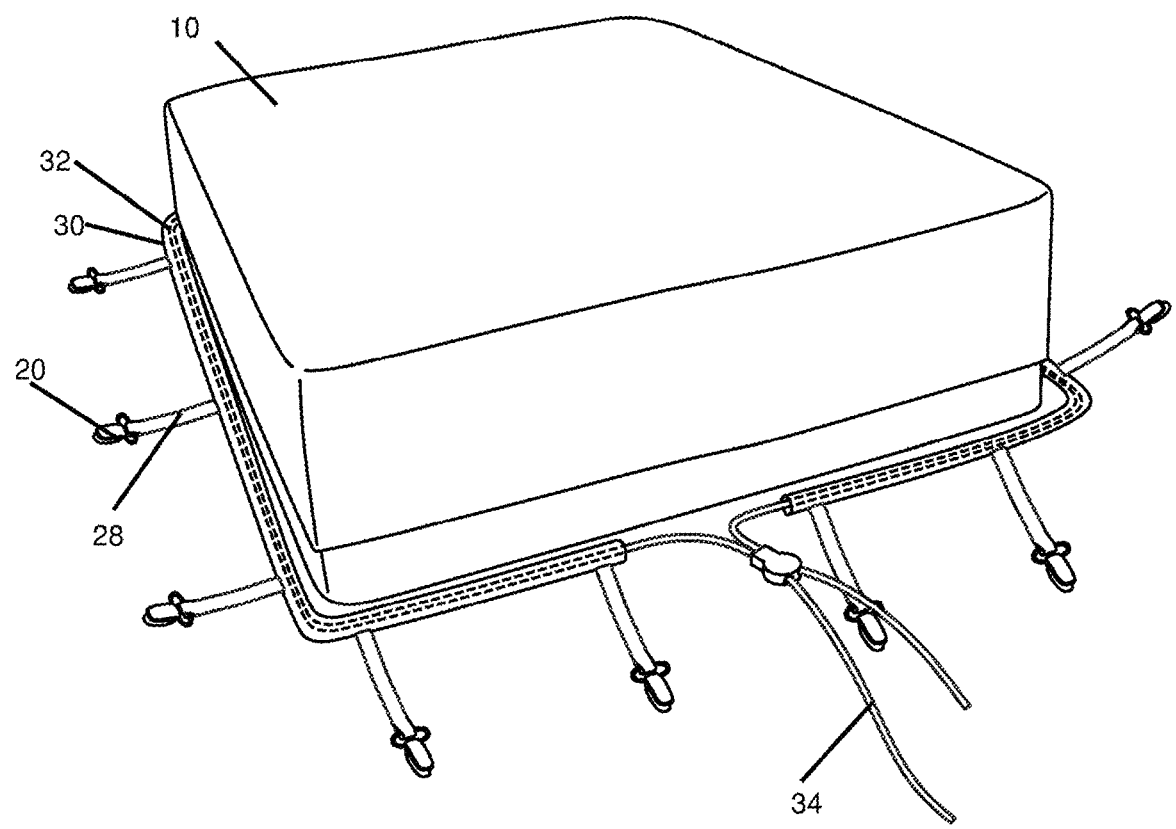
FIG. 7 shows an alternative embodiment of the string cord with cords attached thereto, in an embodiment of the disclosure.

FIG. 7 shows an alternative embodiment of the string cord with cords attached thereto, in an embodiment of the disclosure. Here, the clips 20 are connected to the cord 30 via a connecting region or further cord 28. The cord 28 shown is irremovably connected to the cord 30.

Figure 8:
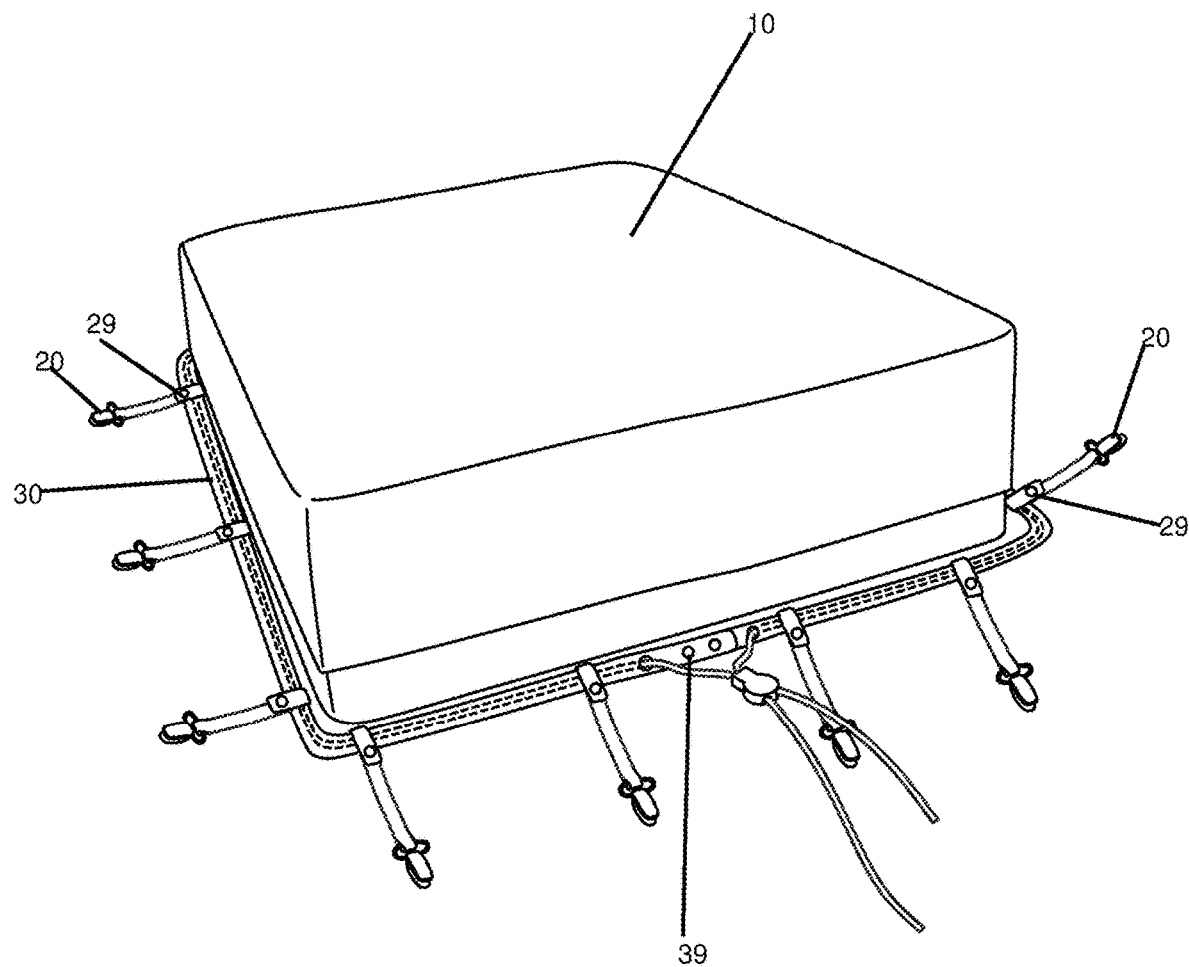
FIG. 8 shows a second alternative embodiment of the string cord with cords snapped thereto, in an embodiment of the disclosure.
Figure 9A:
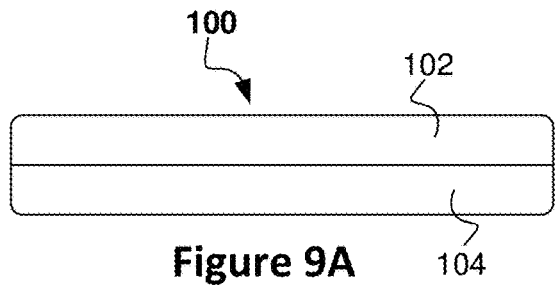
Figure 9B:
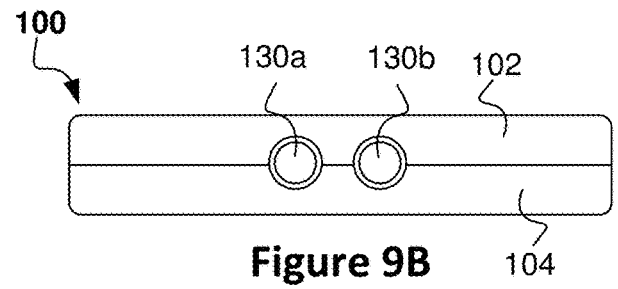
Figure 9C:
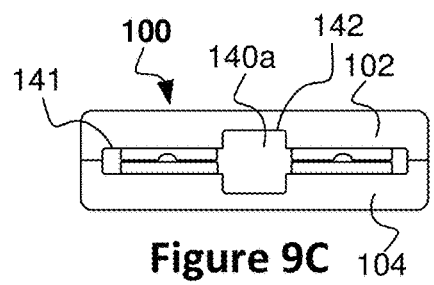
Figure 9D:
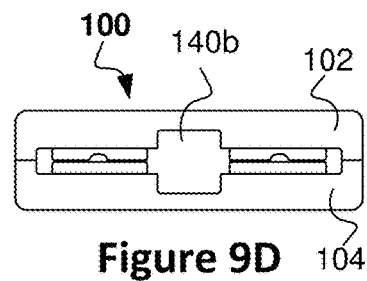
Figure 9E:
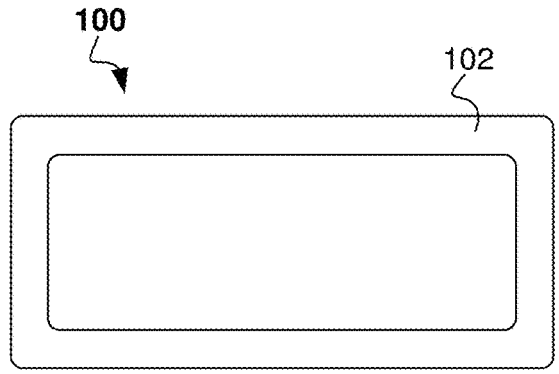
Figure 9F:
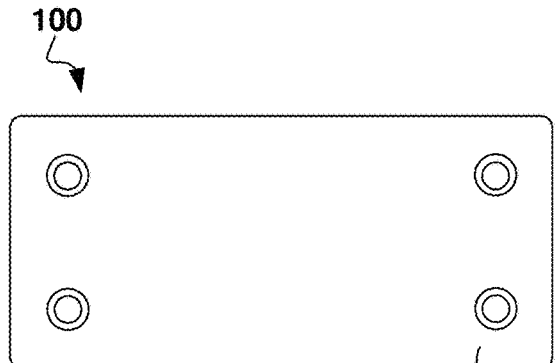
Figure 9G:
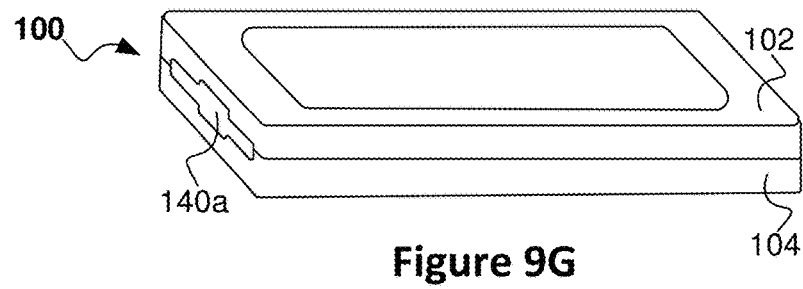

FIG. 8 shows a second alternative embodiment of the string cord with cords snapped thereto, in an embodiment of the disclosure. Here, snaps 29 connect the clips 20 to the cord 30. The cord 30 can further be fastened to itself via snaps 39. This is readily seen when compared to the version shown in FIG. 7. In FIG. 7, note that the inner string 34 exits from ends of the cord 30. In the version shown in FIG. 8, the cord itself snaps together, forming a complete closed loop around the bed 12, under the sheet 10. The string 34, instead, exits from portals in the cord. This allows for a more aesthetically pleasing and, in some cases, structurally sound, configuration.

It will be understood that the instant techniques, methods and systems may be used to cover other items, such as furniture (tables, chairs, sofa, etc.), pools, automobiles, etc. "Sheet-like" is defined as flexible, elongated, and adapted to cover another item such as a table cloth, fabric cover, pool cover, and so forth. A "cord lock" is defined as a device with two portals through which a string or rope can pass through each portal, the device having a mechanism to selectively allow the string or rope to move through the portal or portals with one or more of the following conditions: a) be locked into place, b) move only in one direction through each respective portal, c) and/or more in two directions through each respective portal. Thus, in embodiments it is desired to only allow the string or rope 32 to pass in one direction which causes the string or rope 32 to tighten around an object. When one wants to remove the flexible sheet 12, one might then unlock the cord lock 36 allowing the rope 32 to loosen and be removed from around an object.

As previously described, in some embodiments, free ends of a cord are attached together to form a perimeter. These free ends may be attached together via snaps 39 as shown in FIG. 8, or may be stitched together. Alternatively, a resilient coupler 100 may be used to attach ends of a cord together, or one end of the cord with another element. The general shape of resilient coupler is shown in FIGS. 9A-G, and details of the interior of the coupler will be more fully described with references to FIGS. 10A-B. Generally, resilient coupler 100 is shaped as a rectangular prism and may be formed of a plastic, metal or other rigid material. Coupler 100 may be divided by two mateable portions including an upper portion 102 and a lower portion 104.

Turning to FIGS. 10A-B, upper and lower portions 102, 104 include a variety of elements for mating the two portions and securing a portion of a cord therebetween. Upper portion 102 includes a smooth upper surface that may include a branding element (FIG. 10B). Upper portion 102 may also include a number of cylindrical receivers 110 that mate with cylindrical pins 120 on the lower portion 104. As shown, four spaced cylindrical receivers 110 align with four complimentary cylindrical pins 120. Upper portion 102 further includes a number of projections 112 adjacent the four corners of the upper portion. Each projection 112 may be substantially pyramidal with a wide base attached to the lower surface of the upper portion 102 and a gradually decreasing cross-section as the projection approaches the lower portion. Each projection 112 may further include a threaded hole 114 for accepting a screw or other fastener. Lower portion 104 may include a number of complimentary receptacles 122 that align with, accept, and mate with projections 112 of the upper portion. In at least some examples, each receptacle 122 is in the form of a complementary pair of ramps and a central recess that accepts the projection 112 therein. Each receptacle 122 may include a threaded hole 124 that aligns with hole 114 so that when the upper and lower portions are aligned together, a screw is capable of going through the hole 124 of the receptacle 122, and the hole 114 of the projection 112.

Turning back to FIGS. 9B-D, in some examples, on the front of coupler 100 are a pair of outlets 130a, 130b defined by semi-circular portions of each of the upper and lower portions that are sized to allow a drawstring to pass through each of them. The pair of outlets may be in the form of separate circular eyelets as shown or any other suitable shape that allows a drawstring to exit therethrough. On each side of the coupler 100 is an inlet 140a, 140b. In the embodiment shown, each inlet includes a generally rectangular with an additional longer central region for allowing the drawstring of the cord to pass therethrough. In some examples, each inlet is cross-shaped with short outer extremities 141 as measured from the upper to lower portions, and a longer central region 142.

Coupler 100 may be used with various cords, drawstrings and other fasteners. One example of a cord 200 is shown in FIG. 11A and includes a drawstring 201, an elastic band 202, and an outer sleeve 203 that wraps around the drawstring and the elastic band. The drawstring 201 and the elastic band 202 are shown as extending out of the sleeve 203 by way of explanation, although it will be understood that the sleeve may fully cover the elastic band 202. One or more seams 204 may be used to stitch the outer sleeve 203 shut to envelope the drawstring 201 and the elastic band 202, the drawstring being disposed in, and extending through, the middle of the cord 200 as shown.

FIG. 11B is a schematic that shows the configuration of two portions of cord 200a, 200b being attached within a coupler 100. The upper portion is not shown for the sake of clarity. As shown, each cord 200a, 200b may enter through one of inlets 140a, 140b on the sides of the coupler and may extend between, and be sandwiched by, the projections 112 and receptacles 122. The drawstrings 201 may, in turn, exit out of outlets 130a, 130b on the front of the coupler 100. With the upper and lower portions aligned and mated together, screws may be used to fasten the upper and lower portions together, the screws extending through the lower portion, the holes 124 in the receptacles 122, the cord 200 and the holes 114 in the projections 112.

As shown in FIG. 12, the resilient coupler 100 may be used instead of snaps, and the drawstring 34 may exit out of coupler 100 and through lock 36. Coupler 100 greatly increases the amount of force that can be applied to drawstring 34 resulting in better securement of the cord and fit of the sheets. Additionally, coupler 100 better securely fastens ends of the cord so that the chance of accidental decoupling of the ends of the cord is reduced. Finally, coupler 100 makes attachment of the two ends of the cord easier, less time-consuming and more consistent.

In addition to the embodiments shown above, other variations are possible. For example, as shown in FIG. 13A, a resilient coupler 100a may be used to attach a cord 200 at a first end, and a clip 300 at another end. A second resilient coupler 100b may be coupled to a second end of the cord 200 and to a clip 300b. Such configurations may be used as shown in FIG. 13B to extend cords across a mattress or other object to attach sheets and other elements onto the target object. For example, cords may be used as securing devices that extend across opposing sides (e.g., front-to-back, and/or side-to-side) as opposed to being used to secure a sheet around the perimeter of an object.

Although the invention herein has been described with reference to particular embodiments, it is to be understood that these embodiments are merely illustrative of the principles and applications of the present invention. It is thereof to be understood that numerous modifications may be made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. A rigid coupler having an upper surface, a lower surface and four sides comprising:
    a lower portion;
    an upper portion mateable with the lower portion;
    a first inlet and a second inlet, each defined by the upper and lower portions, the first and second inlets being unobstructed and configured and arranged to receive a portion of a drawstring and an elastic band of a cord, each of the first inlet and the second inlet being disposed on opposing sides of the four sides and having narrow extremities for receiving the drawstring and a region that is taller than the narrow extremities for receiving both the drawstring and the elastic band; and
    at least one outlet defined by the enclosure and configured and arranged to receive a portion of the drawstring of the cord, the at least one outlet being disposed on a third side perpendicular to the opposing ends that define the first inlet and the second inlet;
    wherein the at least one outlet includes two outlets.

2. The rigid coupler of claim 1, wherein the upper and lower portions form a coupler in the shape of a rectangular prism.

3. The rigid coupler of claim 1, wherein the upper and lower portions form a disk-shaped coupler.

4. The rigid coupler of claim 1, wherein the upper and lower portions are of a same size and shape.

5. A rigid coupler having an upper surface, a lower surface and four sides comprising:
    a lower portion;
    an upper portion mateable with the lower portion;
    a first inlet and a second inlet, each defined by the upper and lower portions, the first and second inlets being unobstructed and configured and arranged to receive a portion of a drawstring and an elastic band of a cord, each of the first inlet and the second inlet being disposed on opposing sides of the four sides and having narrow extremities for receiving the drawstring and a region that is taller than the narrow extremities for receiving the drawstring and a region that is taller than the narrow extremities for receiving both the drawstring and the elastic band; and at least one outlet defined by the enclosure and configured and arranged to receive a portion of the drawstring of the cord, and at least one outlet being disposed on a third side perpendicular to the opposing ends that define the first inlet and the second inlet, wherein each of the at least one outlet is circular.

6. A rigid coupler having an upper surface, a lower surface and four sides comprising:

a lower portion;

an upper portion mateable with the lower portion;

a first inlet and a second inlet, each defined by the upper and lower portions, the first and second inlets being unobstructed and configured and arranged to receive a portion of a drawstring and an elastic band of a cord, each of the first inlet and second inlet being disposed on opposing sides of the four sides and having narrow extremities for receiving the drawstring and a region that is taller than the narrow extremities for receiving both the drawstring and the elastic band; and at least one outlet defined by the enclosure and configured and arranged to receive a portion of the drawstring of the cord, the at least one outlet being disposed on a third side perpendicular to the opposing ends that define the first inlet and the second inlet; and a plurality of pins on one of the upper and lower portions, and a plurality of receivers on another of the upper and lower portions, the plurality of pins and the plurality of receivers being aligned with one another.

7. The rigid coupler of claim 6, wherein the plurality of pins and the plurality of receivers are cylindrical.

8. A rigid coupler having an upper surface, a lower surface and four sides comprising:

a lower portion;

an upper portion mateable with the lower portion;

a first inlet and a second inlet, each defined by the upper and lower portions, the first and second inlets being unobstructed and configured and arranged to receive a portion of a drawstring and an elastic band of a cord, each of the first inlet and second inlet being disposed on opposing sides of the four sides and having narrow extremities for receiving the drawstring and a region that is taller than the narrow extremities for receiving both the drawstring and the elastic band; and at least one outlet defined by the enclosure and configured and arranged to receive a portion of the drawstring of the cord, the at least one outlet being disposed on a third side perpendicular to the opposing ends that define the first inlet and the second inlet, further comprising at least one projection on one of the upper and lower portions, and at least one receptacle on another of the upper and lower portions, the at least one projection and the at least one receptacle being aligned with one another, each of the at least one projection and the at least one receptacle defining a hole for accepting a fastener.

9. The rigid coupler of claim 8, wherein the at least one projection is pyramidal and the at least one receptacle has a ramp shape with a central recess to accept the at least one pyramidal projection.

10. The rigid coupler of claim 8, wherein the at least one projection includes four projections and the at least one receptacle includes four receptacles arranged near corners of the rigid coupler.

* * * * *